Figure 1:
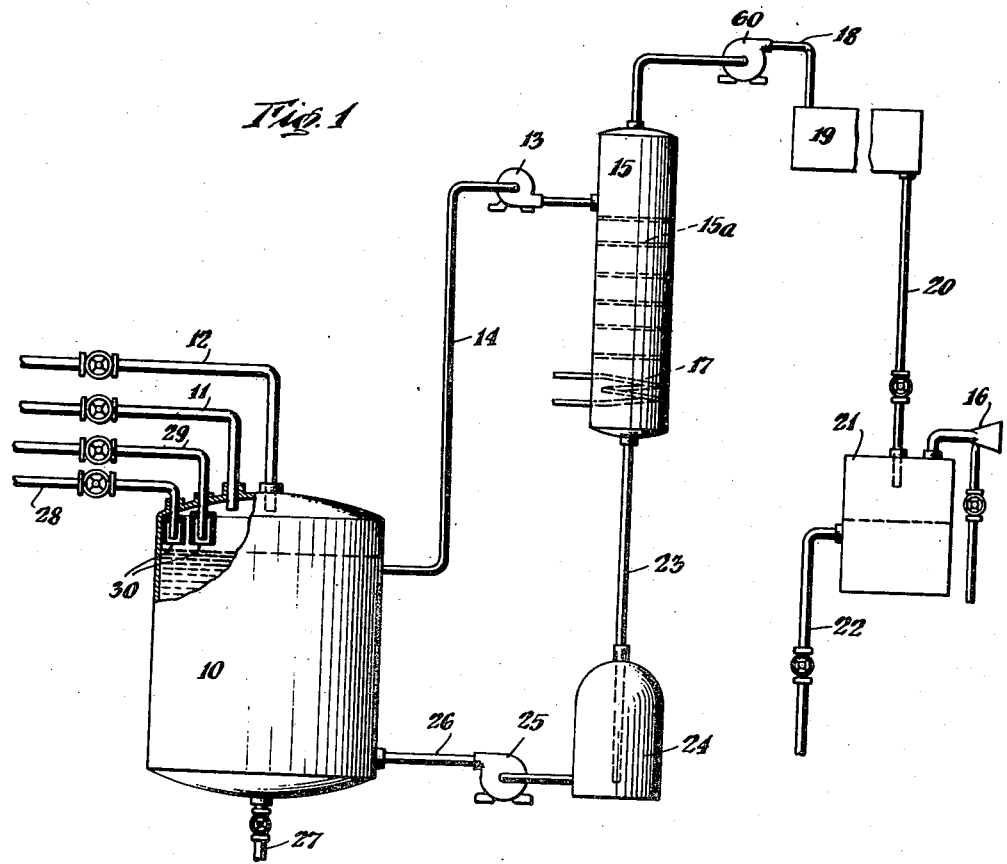

May 4, 1948.  B. C. BOECKELER  2,440,925
FERMENTING METHOD
Filed April 27, 1944  2 Sheets-Sheet 1

INVENTOR.
Benjamin Clark Boeckeler
BY
Norman N. Holland
ATTORNEY

May 4, 1948. B. C. BOECKELER 2,440,925
FERMENTING METHOD
Filed April 27, 1944 2 Sheets-Sheet 2

INVENTOR.
Benjamin Clark Boeckeler
BY
Norman V. Loeland
ATTORNEY

Patented May 4, 1948

2,440,925

UNITED STATES PATENT OFFICE 2,440,925

FERMENTING METHOD

Benjamin Clark Boeckeler, Grosse Ile, Mich., assignor, by mesne assignments, of 9,448/10,570 to Chemprotin Products, Trenton, Mich., a limited partnership of Michigan, 561/10,570 to Laszlo Kormendi, and 561/10,570 to B. Clark Boeckeler Application April 27, 1944, Serial No. 533,036

2 Claims. (Cl. 195—13)

This invention relates to fermentation procedures and is herein illustrated as embodied in a process for the production of ethyl alcohol.

The production of ethyl alcohol, and of certain other organic compounds, by fermentative procedures has been carried out for many years, and, within certain limits, high efficiency has been obtained, but one of the limits of efficiency has arisen from the toxic effect of the product upon the yeast or other ferment after the product, such as alcohol, has reached a well-defined concentration.

Because of the toxic effect of alcohol upon the fermenting organisms becomes a serious handicap at a relatively low concentration, this toxic factor creates serious limitations upon the ultimate efficiency of the overall process of producing alcohol from starchy material, such as grains and from sugars, such as contained in cane syrup, molasses and converted starch.

It has hitherto been attempted to increase the efficiency of the process by increasing the efficiency of the distillation steps for separating the alcohol from the water and other associated impurities. These improved steps of distillation are well-known in the art and stills have been produced and operated on a large scale which approximate closely the theoretical limits of possible efficiency. Those distilling procedures, as hitherto applied, formed batch steps in the fermentation process, and it was believed that no fundamental modification of the process as a whole could be successfully applied.

According to one form of the present invention, the usual batch fermentation process is altered in a continuous or quasi-continuous process, in which the alcohol content of the fermenting batch is reduced from time to time, or during a part of the operation, so that the fermenting mass may yield alcohol continuously over a much longer period than has hitherto been found possible.

The invention is described in some detail as embodied in removing the alcohol by distilling but also alternative methods are described according to one of which the alcohol is stripped from the fermenting mass by agitation with an immiscible solvent.

It may be possible to carry out the procedures of various forms of the invention in various forms of apparatus.

Certain forms of apparatus are herein illustrated and certain procedures described by way of example to guide those skilled in the art in applying the invention in its best form to the problem in hand.

Other features and advantages will hereinafter appear.

In the accompanying drawings—

Fig. 1 diagrammatically shows a fermentation apparatus including devices for continuously removing alcohol during the fermentation procedure.

Figure 2:
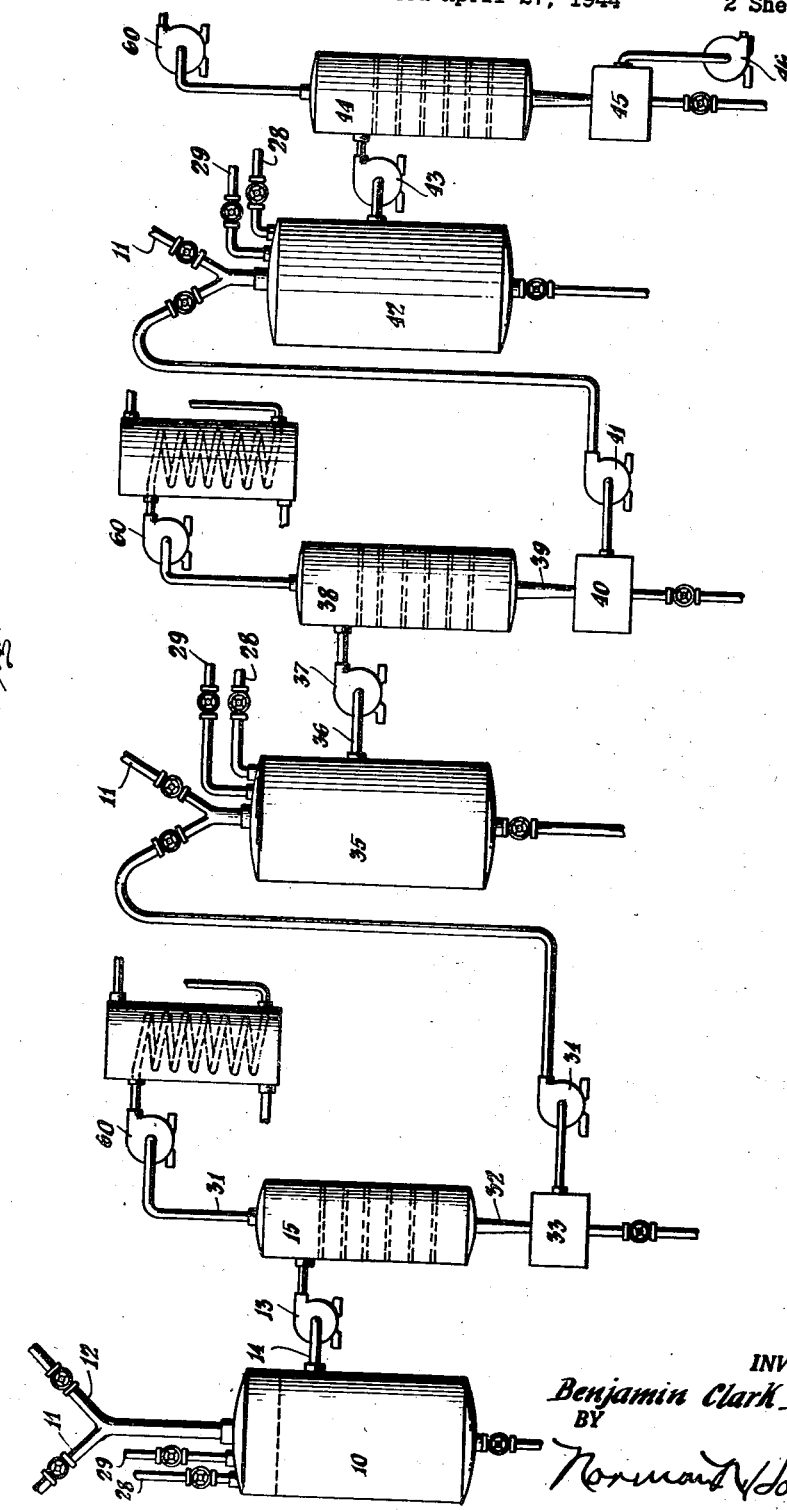

Fig. 2 diagrammatically shows a fermentation apparatus in which the fermenting material is passed through successive fermenters and alcohol is removed between them.

Figure 3:
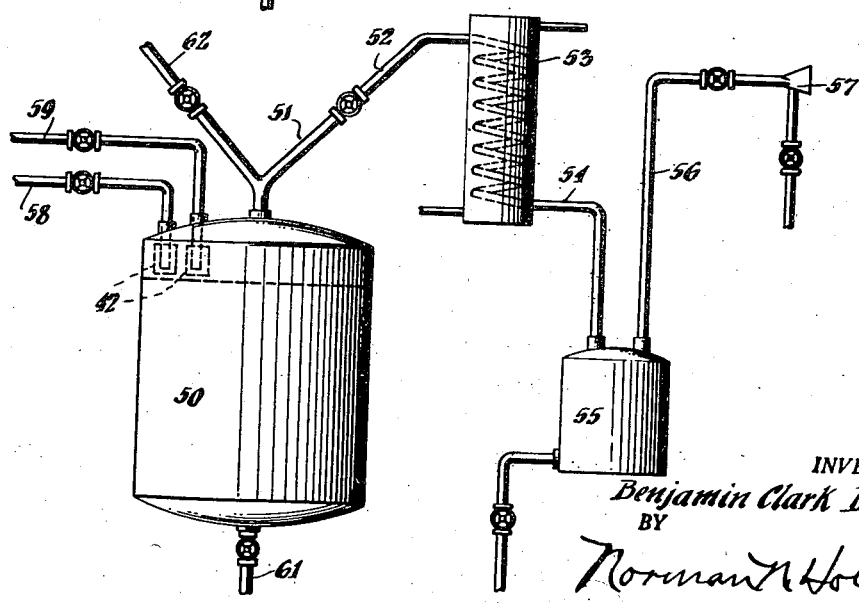

Fig. 3 diagrammatically shows removal of alcohol from a fermenter during the fermentation therein.

In the form shown in Fig. 1, a fermenter vessel 10 is charged with the starch or grain or sugar-containing material and water and other suitable ingredients, including yeast, through a valved pipe line 11, and carbon dioxide produced in the fermentation leaves through a valved vent 12.

After fermentation has processed for some time, alcohol begins to build up in the mash or liquor contents of fermenter 10, and, when a suitable concentration has been reached, part of the fermenting liquor is removed at a controlled rate as by being pumped out by a pump 13 through a pipe 14 and pumped into a stripping tower 15, which is only conventionally shown.

A vacuum is maintained of suitable amount for commercial work, as by a jet vacuum conventionally shown at 16, and the temperature in the tower 15 is maintained by a coil 17 at a point low enough not to kill the yeast during distillation, that is, not far from 98° F.

At that temperature the liquid coming from the fermenter will not be above 98° F. and may contain 4% of alcohol. The upper part of the tower may be maintained at 34 mm. mercury, absolute, and vapors of 35% alcohol may flash off, reducing the temperature to 85° F. Further stripping would remove more alcohol as the liquid flowed down over the six stripping decks 15a. Theoretically, the complete removal of alcohol at a temperature of 98° F. in the bottom of the stripper would involve a pressure of 46 mm. of mercury there.

The alcohol thus distills off, along with water vapor and some air and carbon dioxide, through the top pipe 18 and enters a condenser 19 refrigerated so as to condense the alcohol vapor. The vacuum device at 16 draws along through the valved exit pipe 20 the condensed alcohol and air and carbon dioxide, delivering the liquid to a receiver 21 provided at the top with the vacuum jet 16, and kept at a low enough temperature to substantially retain the condensed alcohol which is drawn off as desired by a valved pipe 22 for redistillation.

The remainder of the liquor nearly freed from alcohol in the tower 15 runs through a pipe 23 which may be high enough to maintain a suitable vacuum in the tower by a liquid column, and is delivered to a receiving tank 24.

From the tank 24, a pump 25 is shown as returning the stripped liquor to the fermenter 10 through a pipe 26.

At the conclusion of a run the residual mash is shown as withdrawn through a valved bottom outlet 27.

If it is found desirable to make up air or carbon dioxide for that withdrawn by the tower 15, either or both may be provided through a valved intake 28 or 29 provided with diagrammatically shown internal extensions 30 adapted to be so set as to deliver the air or carbon dioxide either above or below the surface of the mash, at will, to control the operating conditions. More mash may be added, as desired, through the pipe 11, of suitable water and solid content to maintain the desired conditions.

According to the above procedure, the operator alters the valves or operates the pumps to start the continuous separation of alcohol at will, and to stop it at will, returning the stripped mash to the fermenter, and positively controlling the operation.

Fig. 2 shows an alternative structure and procedure in diagrammatic form, omitting many minor pipes and other parts. In Fig. 2 the first fermenter 10 may be provided with the valved outlets and inlets 11, 12, 27, 28 and 29, and these carry or pump the mash a little at a time or continuously but slowly through a pipe 14 by a pump 13 to a first stripping tower 15 which distills off alcohol to be carried off by a pipe 31 which also maintains a vacuum and leads to an alcohol recovery device or system and, if desired, to a separate vacuum device. The stripped mash residue flows through a bottom pipe 32 to a receiver 33, from which it is drawn by a pump 34 and sent on to a second fermenter 35 where fermentation again flourishes by reason of the removal of the deleterious amounts of alcohol.

The mash in the second fermenter 35 is similarly adapted to be withdrawn when excessive alcohol is present, the fermenter 35 for this purpose having an exit pipe 36, through which the mash is shown as drawn by a pump 37.

The withdrawn mash is sent on by the pump 37 to a stripping tower 38 where alcohol is again removed while the residual mash flows through a bottom pipe 39 to a receiver 40.

If desired, the mash in the receiver 40 is sent on by a pump 41 to a third fermenter 42 in which fermentation again flourishes by reason of the removal of the deleterious amounts of alcohol. The mash in the third fermenter 42 after sufficient fermentation may be withdrawn by a pump 43 and sent on to a stripping tower 44 which removes alcohol, as in the two towers 15 and 38, and the mash is delivered to a bottom receiver 45 and pumped on for further fermentation or to other treatment by a pump 46.

It is possible to operate the whole system of fermenters 10, 35, 42, and their connections continuously by slow flow of mash, or intermittently in batches, in any event drawing off and recovering further alcohol by vacuum at each tower 15, 38, 44, so far as desirable, at a temperature proper to keep the process functioning smoothly.

One advantage of the above described processes is that they require no specially built fermenters to withstand the pressure which would bear upon them if a vacuum were maintained within them. Moreover, mash, of any desired composition, and air or other materials, may be added at each fermenter to utilize the yeast and other materials present to the best advantage.

Fig. 3 shows another alternative structure employing a fermenter which is strong enough to withstand the outside pressure resulting from a vacuum.

The fermenter 50 is shown as having a valved outlet 51 at the top which is connected by a pipe 52 to a condenser 53 having a delivery pipe 54 leading to a receiver 55 for alcohol. To the receiver 55 is connected a second top pipe 56 ending in a valved vacuum device 57, shown as a steam jet, to obtain and, if desired, maintain a vacuum on the fermenter 50.

To replace, if need be, air or carbon dioxide to foster fermentation there are shown a valved inlet 58 and a valved carbon dioxide inlet 59 with internal extensions adjustable to deliver above or below the mash surface. There is also shown a valved feed inlet 62 and a valved drain 61.

Thus it is possible to operate the fermenter 50 either under a continuous vacuum, or under an intermittent vacuum, varying conditions by air and carbon dioxide feed either continuously or intermittently at will, if desired.

A fourth alternative avoids the use of a vacuum, but removes, continuously or intermittently a part of the fermenter contents, removing the contained alcohol to a considerable degree by agitating with a solvent immiscible with the water, separating from the mash the layer or solvent-carrying alcohol, and either returning the removed part with a greatly reduced alcohol content, or separately continuing the fermenting after the alcohol is thus removed.

The complete procedure involves removing the immiscible solvent from the alcohol, usually by distillation and re-using the immiscible solvent.

Some of the solvents miscible with alcohol but substantially immiscible with water are; n-butyl ether, dibutyl phthalate, n-hexanol, octyl acetate, octyl alcohol and trichlorethylene.

The method of the separation of the layer of mash from solvent-carrying alcohol will depend on the specific gravity of the immiscible solvent and on other physico-chemical conditions as are well known to those skilled in the art.

The various vacuums have been diagrammatically shown and described as maintained by steam jets, as the simplest efficient means of maintaining a vacuum. The process may be perhaps more economically worked as a whole if the vacuum in Fig. 1, for example, is maintained by a pump 60 between the stripper 15 and the condenser 19 to work at higher, say an atmospheric pressure, instead of under a high vacuum. This avoids the need for the vacuum steam nozzle 16.

Under many conditions it may be more economical to recover the alcohol at 19 by a preferentially active adsorbent, such as activated carbon, which avoids some problems of dealing with the associated air and carbon dioxide.

After such removal of alcohol the carbon dioxide may be recovered in any suitable manner, and the alcohol separated from the adsorbent by any known or desired procedure.

A pump, like pump 60, may maintain the vacuum instead of a steam jet in each of the systems shown, and thus enable the alcohol to be condensed under any desired pressure instead of from a high vacuum in the strippers 15, 38 and 44.

It is possible to so operate the process of the present invention so as to greatly reduce the amount of inert water to be disposed of, and to obtain other advantages.

In the ordinary fermentation procedures the fermenting material, sugar or starch, for example, is charged at such a concentration that it will be completely fermented when the alcohol produced has reached 10 or 12% alcohol content, because that content is the maximum alcohol strength in which the yeast can survive or can endure.

This means that at the end of the usual fermenting operation it is necessary to evaporate most of 7 to 8½ volumes of inert water to separate the water from the "distillers residue" to make the residues salable.

According to the present invention it is possible to add fermenting material such as starch or sugar to the fermenter while distilling off alcohol, thus obtaining several advantages in addition to, in effect, eventually incorporating in a single batch all the "distillers residue" from all the fermenting material added.

One of these additional advantages arises from the larger production of alcohol and of "distillers residue" obtainable from a given fermenter.

Another of the additional advantages arises from the continuous use of the same yeast in long continued fermenting, thus avoiding much of the usual loss of the fermentable material which is consumed in manufacturing the new yeast cells hitherto needed for every added batch of fermentable material.

A third additional advantage arises from the high concentration of yeast cells maintained in the fermenter with the result that a high rate of alcohol fermentation is maintained after the rate is once established. To put the facts another way, the same yeast acts through a number of cycles.

The process of operating the device of Figure 2 often involves the addition of fermenting material to each of the fermenters 35 and 42 at their valved inlets 11, and often involves the addition of air at their valved inlets 28, and the release of carbon dioxide by the valve pipe 29, although the pipe 29 may serve either as inlet or release pipe.

In the device of Figure 2, during a normal run all of the solids are usually removed at the pump 48, thus providing a liquid mass relatively high in solids to be evaporated down to yield distillers residue, thus saving much of the fuel ordinarily consumed.

It will be seen that the present invention provides an effective method for the fermentation of a liquid mass to produce alcohol which permits maximum fermentation with a minimum of retardation of yeast growth. The toxic effect of the alcohol upon the fermenting organism is materially reduced. The process may be performed by changes in the present distilling equipment without excessive expenditures for new equipment.

As various changes may be made in the form, construction and arrangement of the parts and steps herein without departing from the scope and spirit of the invention and without sacrificing any of its advantages, it is to be understood that all matter herein is to be interpreted as illustrative and not in a limiting sense.

Having thus described certain embodiments of the invention in some detail, what is claimed is:

1. A process for the production of alcohol which comprises fermenting a main body of mash with yeast to produce a substantial concentration of alcohol, then continuously removing a part of the fermenting mash liquor, subjecting the part being continuously removed to distillation under reduced pressure, continuously removing alcohol under reduced pressure from the part undergoing distillation, continuously condensing the said removed alcohol, continuously withdrawing alcohol-stripped mash liquor from the said part undergoing distillation, fermenting the said alcohol-stripped mash liquor, then continuously removing a part of the thus fermented alcohol-stripped mash liquor and subjecting the same to distillation under reduced pressure independently of the first distillation, continuously removing alcohol from the resulting fermented stripped mash liquor undergoing distillation and independently condensing the same, continuously withdrawing the further stripped part of the mash liquor and subjecting the same to fermentation, then continuously removing a part of the fermenting further stripped part of the mash liquor and independently subjecting the same to distillation under reduced pressure to remove alcohol therefrom and independently condensing the alcohol thus distilled from the last-named part.

2. A continuous process for the production of alcohol which comprises fermenting a main body of mash with yeast to produce a substantial concentration of alcohol, then continuously removing a part of the fermenting mash liquor, subjecting the part continuously removed to distillation under reduced pressure, continuously removing alcohol under reduced pressure from the part undergoing distillation, continuously condensing the said removed alcohol, continuously withdrawing alcohol-stripped mash liquor from the said part undergoing distillation to form a second body of mash liquor, fermenting the said second body of mash liquor, then continuously removing a part of the fermented second body of mash liquor and independently subjecting the same to distillation under reduced pressure, continuously removing alcohol under reduced pressure from the part of the said fermented second body subjected to distillation and independently condensing the same, continuously withdrawing stripped mash liquor from the said second body to form a third body of mash liquor, fermenting the said third body of mash liquor, continuously removing a part of the fermented third body and independently subjecting the same to distillation under reduced pressure to remove alcohol therefrom, independently condensing the last named alcohol and providing a slow flow of mash to each of said bodies to maintain the process in continuous operation.

BENJAMIN CLARK BOECKELER.

REFERENCES CITED

The following references are of record in the file of this patent:

UNITED STATES PATENTS

| Number | Name | Date |
|---|---|---|
| 419,332 | Horne | Jan. 14, 1890 |
| 1,261,328 | Wagner | Apr. 2, 1918 |
| 1,884,272 | Sak | Oct. 25, 1932 |
| 2,053,770 | Dreyfus | Sept. 8, 1936 |
| 2,155,134 | Karsch | Apr. 18, 1939 |
| 2,338,228 | Boeckeler | Jan. 4, 1944 |

OTHER REFERENCES

De Becze & Rosenblatt, "Continuous Fermentation," Am. Brewer, Feb. 1943.